(12) United States Patent
Jahr

(10) Patent No.: US 9,300,629 B1
(45) Date of Patent: Mar. 29, 2016

(54) PASSWORD CONSTRAINT ENFORCEMENT USED IN EXTERNAL SITE AUTHENTICATION

(71) Applicant: Palo Alto Networks, Inc., Santa Clara, CA (US)

(72) Inventor: Jeffrey Stephen Jahr, Hayward, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 3 days.

(21) Appl. No.: 13/951,287

(22) Filed: Jul. 25, 2013

Related U.S. Application Data

(60) Provisional application No. 61/829,674, filed on May 31, 2013.

(51) Int. Cl.
*H04L 29/06* (2006.01)

(52) U.S. Cl.
CPC .............. *H04L 63/02* (2013.01); *H04L 63/083* (2013.01)

(58) Field of Classification Search
CPC ....................................................... H04L 63/08
USPC ............................................................ 726/5
See application file for complete search history.

(56) References Cited

U.S. PATENT DOCUMENTS

| | | | |
|---|---|---|---|
| 7,152,244 B2 * | 12/2006 | Toomey ......................... | 726/26 |
| 8,640,231 B2 | 1/2014 | Florencio et al. | |
| 8,769,607 B1 * | 7/2014 | Jerdonek et al. .................. | 726/1 |
| 2003/0005036 A1 | 1/2003 | Mitzenmacher | |
| 2004/0015725 A1 * | 1/2004 | Boneh et al. ................... | 713/201 |
| 2011/0231653 A1 * | 9/2011 | Bollay et al. .................. | 713/153 |
| 2013/0262655 A1 * | 10/2013 | Desch nes et al. ............ | 709/224 |

OTHER PUBLICATIONS

Bonomi et al., An Improved Construction for Counting Bloom Filters, 2006.
John C.A Bambenek, Data Loss Prevention, SANS Institute InfoSec Reading Room, Aug. 15, 2008.
Eugene H. Spafford, OPUS: Preventing Weak Password Choices, Jun. 1991.

* cited by examiner

*Primary Examiner* — Kambiz Zand
*Assistant Examiner* — Thanh Le
(74) *Attorney, Agent, or Firm* — Van Pelt, Yi & James LLP

(57) ABSTRACT

Techniques for password constraint enforcement used in external site authentication are disclosed. In some embodiments, password constraint enforcement used in external site authentication includes monitoring encrypted network communications between a client and an external site (e.g., a remote server), in which the encrypted network communications are encrypted using a first protocol (e.g., Secure Sockets Layer (SSL) protocol, HTTPS protocol, or another protocol for encrypted network communications); and determining if the client sends a request to create user credentials for an external site authentication. In some embodiments, password constraint enforcement used in external site authentication further includes performing password constraint enforcement used in the external site authentication.

19 Claims, 8 Drawing Sheets

PASSWORD CONSTRAINT ENFORCEMENT USED IN EXTERNAL SITE AUTHENTICATION

CROSS REFERENCE TO OTHER APPLICATIONS

This application claims priority to U.S. Provisional Patent Application No. 61/829,674 entitled PASSWORD CONSTRAINT ENFORCEMENT USED IN EXTERNAL SITE AUTHENTICATION filed May 31, 2013, which is incorporated herein by reference for all purposes.

BACKGROUND OF THE INVENTION

A firewall generally protects networks from unauthorized access while permitting authorized communications to pass through the firewall. A firewall is typically a device or a set of devices, or software executed on a device, such as a computer, that provides a firewall function for network access. For example, firewalls can be integrated into operating systems of devices (e.g., computers, smart phones, or other types of network communication capable devices). Firewalls can also be integrated into or executed as software on computer servers, gateways, network/routing devices (e.g., network routers), or data appliances (e.g., security appliances or other types of special purpose devices).

Firewalls typically deny or permit network transmission based on a set of rules. These sets of rules are often referred to as policies. For example, a firewall can filter inbound traffic by applying a set of rules or policies. A firewall can also filter outbound traffic by applying a set of rules or policies. Firewalls can also be capable of performing basic routing functions.

BRIEF DESCRIPTION OF THE DRAWINGS

Various embodiments of the invention are disclosed in the following detailed description and the accompanying drawings.

DETAILED DESCRIPTION

Figure 1:
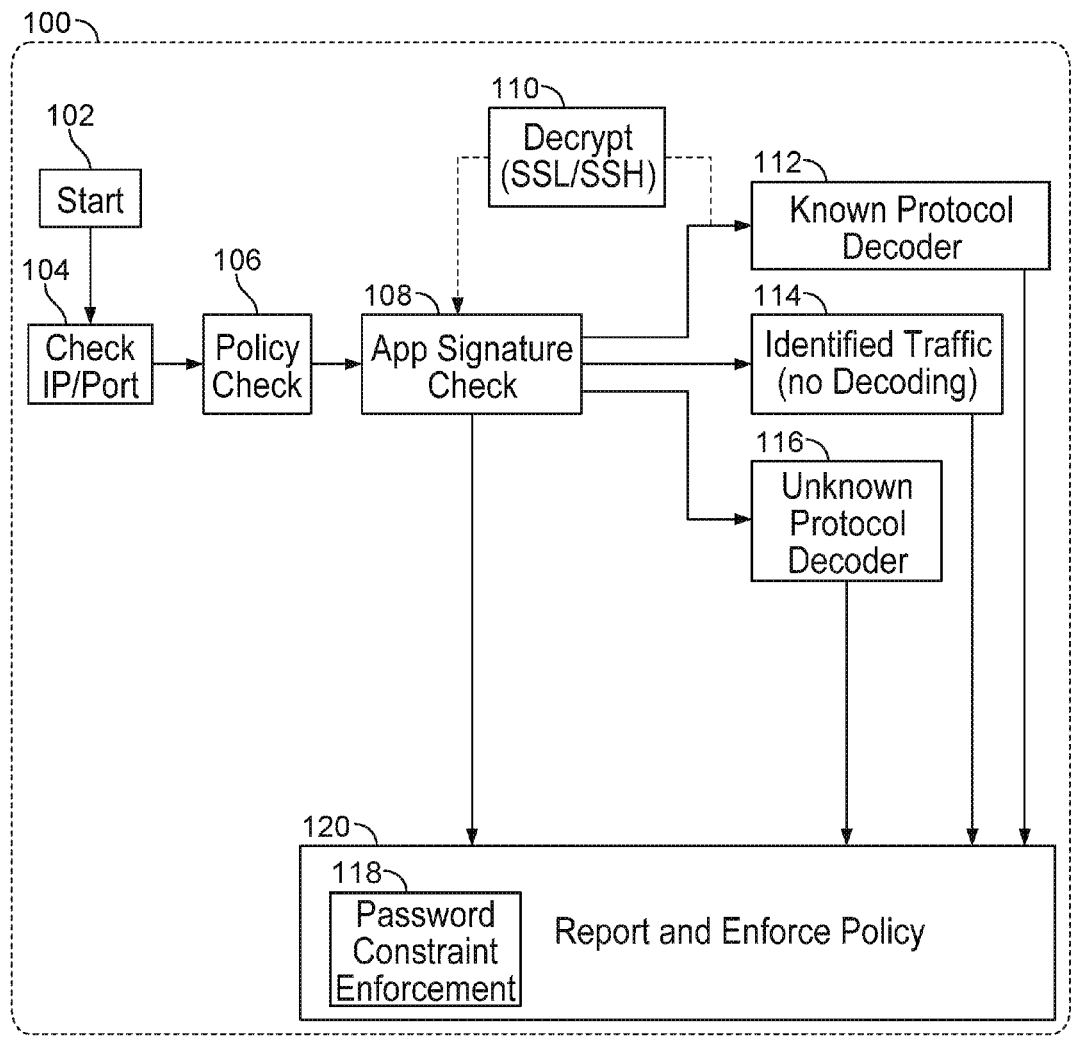
FIG. 1 is a functional diagram of an architecture of a security device that can be used for providing password constraint enforcement used in external site authentication in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A firewall generally protects networks from unauthorized access while permitting authorized communications to pass through the firewall. A firewall is typically a device, a set of devices, or software executed on a device that provides a firewall function for network access. For example, a firewall can be integrated into operating systems of devices (e.g., computers, smart phones, or other types of network communication capable devices). A firewall can also be integrated into or executed as software applications on various types of devices or security devices, such as computer servers, gateways, network/routing devices (e.g., network routers), or data appliances (e.g., security appliances or other types of special purpose devices).

Firewalls typically deny or permit network transmission based on a set of rules. These sets of rules are often referred to as policies (e.g., network policies or network security policies). For example, a firewall can filter inbound traffic by applying a set of rules or policies to prevent unwanted outside traffic from reaching protected devices. A firewall can also filter outbound traffic by applying a set of rules or policies (e.g., allow, block, monitor, notify or log, and/or other actions can be specified in firewall rules or firewall policies, which can be triggered based on various criteria, such as described herein).

Security devices (e.g., security appliances, security gateways, security services, and/or other security devices) can include various security functions (e.g., firewall, anti-malware, and intrusion prevention/detection, and/or other security functions), networking functions (e.g., routing, Quality of Service (QoS), workload balancing of network related resources, and/or other networking functions), and/or other functions. For example, routing functions can be based on source information (e.g., IP address and port), destination information (e.g., IP address and port), and protocol information.

A basic packet filtering firewall filters network communication traffic by inspecting individual packets transmitted over a network (e.g., packet filtering firewalls or first generation firewalls, which are stateless packet filtering firewalls). Stateless packet filtering firewalls typically inspect the individual packets themselves and apply rules based on the inspected packets (e.g., using a combination of a packet's source and destination address information, protocol information, and a port number).

Application firewalls can also perform application layer filtering (e.g., application layer filtering firewalls or second generation firewalls, which work on the application level of the TCP/IP stack). Application layer filtering firewalls or application firewalls can generally identify certain applications and protocols (e.g., web browsing using HyperText Transfer Protocol (HTTP), a Domain Name System (DNS) request, a file transfer using File Transfer Protocol (FTP), and various other types of applications and other protocols, such as Telnet, DHCP, TCP, UDP, and TFTP (GSS)). For example, application firewalls can block unauthorized protocols that attempt to communicate over a standard port (e.g., an unauthorized/out of policy protocol attempting to sneak through by using a non-standard port for that protocol can generally be identified using application firewalls).

Stateful firewalls can also perform stateful-based packet inspection in which each packet is examined within the context of a series of packets associated with that network transmission's flow of packets/packet flow (e.g., stateful firewalls or third generation firewalls). This firewall technique is generally referred to as a stateful packet inspection as it maintains records of all connections passing through the firewall and is able to determine whether a packet is the start of a new connection, a part of an existing connection, or is an invalid packet. For example, the state of a connection can itself be one of the criteria that triggers a rule within a policy.

Advanced or next generation firewalls can perform stateless and stateful packet filtering and application layer filtering as discussed above. Next generation firewalls can also perform additional firewall techniques. For example, certain newer firewalls sometimes referred to as advanced or next generation firewalls can also identify users and content (e.g., next generation firewalls). In particular, certain next generation firewalls are expanding the list of applications that these firewalls can automatically identify to thousands of applications. Examples of such next generation firewalls are commercially available from Palo Alto Networks, Inc. (e.g., Palo Alto Networks' PA Series firewalls). For example, Palo Alto Networks' next generation firewalls enable enterprises to identify and control applications, users, and content—not just ports, IP addresses, and packets—using various identification technologies, such as the following: APP-ID for accurate application identification, User-ID for user identification (e.g., by user or user group), and Content-ID for real-time content scanning (e.g., controls web surfing and limits data and file transfers). These identification technologies allow enterprises to securely enable application usage using business-relevant concepts, instead of following the traditional approach offered by traditional port-blocking firewalls. Also, special purpose hardware for next generation firewalls implemented, for example, as dedicated appliances generally provide higher performance levels for application inspection than software executed on general purpose hardware (e.g., such as security appliances provided by Palo Alto Networks, Inc., which utilize dedicated, function specific processing that is tightly integrated with a single-pass software engine to maximize network throughput while minimizing latency).

However, weak user credentials (e.g., weak username and password credentials for user authentication) can create security vulnerabilities for enterprises. As a result, many enterprises have policies that include password complexity constraints for their internal users. For example, it can also be desirable to provide techniques that allow enterprises to enforce a policy that includes the same or similar password constraint requirements for their internal users creating authentication credentials on external sites (e.g., web sites, web services, and/or other third party/external online sites/services that require the creation of user credentials for user authentication). As another example, some enterprises may also want to enforce various other password usage polices for its internal users, such as a policy to not use the same password on multiple external sites and/or a policy to not reuse the user's enterprise password on external sites. However, because such external site authentication is generally created on a site-by-site basis that is not under the control of the enterprise (e.g., the security/IT of the enterprise), the enterprise is generally unable to automatically enforce such policies.

As a result, this problem presents a security risk for enterprises that users may also use the same and/or similar user login/password credentials for external sites. In particular, certain external sites may be compromised and/or not reputable (e.g., untrustworthy), and/or not subject to the enterprise security constraints, policies, controls. As such, duplicating user authentication credentials as used by the user on their enterprise with external sites or duplicating user credentials across multiple external entities presents a single point of failure/security risk that the enterprise may want to avoid. Also, using weak user/password credentials on external sites also presents security risks that the enterprise may want to avoid. For example, such can pose serious security risks to an enterprise, such as for its sales personnel using external sales/CRM site/service, its marketing personnel using an external online networking/marketing site, its users/employees using an external collaboration site/service, its users/employees using an external email site/service, and/or its users/employees using other external sites that can be used for enterprise related purposes by internal users of the enterprise.

Thus, what are needed are techniques for password constraint enforcement used in external site authentication. Accordingly, techniques for password constraint enforcement used in external site authentication are disclosed.

For example, many external sites (e.g., websites, apps for mobile devices that provide cloud/web-based services, and/or other external sites) that require user/login credentials for authentication to the external site use secure protocols (e.g., Secure Sockets Layer (SSL), HTTPS, and/or other secure/encrypted protocols) to keep the password data private (e.g., the password data is not sent in the clear over the Internet, as it is encrypted using a secure protocol). As described herein, in accordance with various embodiments, techniques are disclosed for decrypting such sessions with external sites (e.g., using a security device, such as a firewall) in order to determine if a new username and password are being communicated with an external site (e.g., un-obfuscated in a form value, and that value is frequently named 'password' or 'pass').

For example, when a firewall decrypts an SSL or HTTPS session, a decoder for the web application identifies the login/password fields that are specific to that external site (e.g., or searches for 'login' and 'password' or a regular expression (regexp) pattern match for same, if an App-ID for the external site is not available), and then the firewall can perform a password complexity check against the value that the user submitted to the external site in order to provide for password constraint enforcement used in external site authentication. Based on the results, the firewall can perform various actions in response to determining that the password complexity check reveals that the user/pass submission sent by the user was not sufficient based on the policy, such as to log a vulnerability whenever it sees a user attempting to send a non-compliant password, alerting the user that such is a non-compliant password, blocking the user from accessing the external site until adequate user/password credentials are created (e.g., injecting a block/continue page into the stream that the user would see), and/or various other actions as further described herein. For example, when a user Alice, who is an employee at ACME Company, attempts to create a username and password on an external social networking, email, or collaboration-related web site using user credentials (e.g., a username and password) that fail to satisfy a user credentials policy of ACME Company (e.g., a password complexity requirement and/or other/additional user credentials related requirements), the firewall can then detect such and perform a responsive action (e.g., alert, log, block, notify Alice to select different user credentials, suggest more complex/compliant password options to Alice to possibly select for her user credentials for that external site, and/or perform another or additional actions).

As another example, a source for the connection (e.g., user ID or address) can also be maintained in a user credentials cache of external sites and password hashes that the source has used for one or more external sites. Using such a user credentials cache, a firewall can trigger a vulnerability if the user attempts to use the same login/password combination at different external sites and/or for enterprise/internal sites (e.g., external login/password combinations should not match any internal LDAP or other internal enterprise user credentials). For example, when a user Bob, who is an employee at ACME Company, attempts to create a username and password on an external sales/CRM-related web site using user credentials (e.g., a username and password) that match (e.g., or are very similar to and/or not sufficiently different from) the user credentials that Bob uses for accessing computing/networking-related resources of ACME Company (e.g., computer logon, e-mail, LDAP, VPN, and/or other related resources), then the firewall can detect such and perform a responsive action (e.g., alert, log, block, notify Bob to select different user credentials, and/or perform another or additional actions).

As yet another example, if user credentials are known or determined to have been compromised at an external site, an enterprise can use such a user credentials cache to perform a responsive action. For example, the enterprise can require any users that have accounts with such an external site to reset their user name/password credentials, block its users from accessing that external site, and/or require any users that have accounts with such an external site to reset their user name/password credentials to be sufficiently different on any other external or internal sites (e.g., before any further access to any such sites is permitted) that such users have any identical or similar user/password credentials with that compromised external site. For example, if users Alice and Bob, who are both employees at ACME Company, had previously created an account with user credentials on an external site that has recently been compromised, then the firewall can block Alice and Bob from accessing that external site, require Alice and Bob to create new user credentials before allowing them to access that external site, and/or perform some other action (e.g., alert, log, block, and/or perform another or additional actions).

Accordingly, the various techniques described herein can facilitate the enforcement of password constraint policies to external sites that are generally not under the control of the enterprise. Such techniques can also promote and enforce proper password management policies for users of the enterprise. Also, these techniques can alert the enterprise (e.g., internal IT/security admins of the enterprise) to users who have passwords to external sites that present potential security risks for the enterprise.

In some embodiments, password constraint enforcement used in external site authentication includes monitoring encrypted network communications between a client and an external site (e.g., using a security device, such as a firewall to provide man-in-the-middle decryption techniques, such as described herein), in which the encrypted network communications are encrypted using a first protocol (e.g., Secure Sockets Layer (SSL) protocol, HTTPS, or another protocol for encrypted network communications); and determining if the client sends a request to create user credentials for an external site authentication. In some embodiments, password constraint enforcement used in external site authentication further includes performing password constraint enforcement used in the external site authentication.

In some embodiments, password constraint enforcement used in external site authentication further includes performing password constraint enforcement used in the external site authentication, in which the password constraint enforcement is based on a username constraint, a password constraint, or both a username constraint and a password constraint.

In some embodiments, password constraint enforcement used in external site authentication further includes performing an action in response to determining that the client sent a request to create user credentials for an external site authentication.

In some embodiments, password constraint enforcement used in external site authentication further includes decrypting the monitored encrypted network communications between the client and the external site to implement password constraint enforcement used in the external site authentication.

In some embodiments, password constraint enforcement used in external site authentication further includes intercepting a request to establish an encrypted session from the client to the external site; and sending a request to establish the encrypted session on behalf of the client to the external site.

In some embodiments, password constraint enforcement used in external site authentication further includes intercepting a request to establish an encrypted session from the client to the external site; sending a request to establish the encrypted session on behalf of the client to the external site; and sending an encrypted session response to the client on behalf of the external site using a session key associated with the firewall device.

In some embodiments, password constraint enforcement used in external site authentication further includes intercepting a request to establish an encrypted session from the client to the external site; sending a request to establish the encrypted session on behalf of the client to the external site; sending an encrypted session response to the client on behalf of the external site using a session key associated with the firewall device; and decrypting encrypted session traffic between the client and the external site to monitor for a request from the client to create a tunnel using the first protocol with the external site.

In some embodiments, password constraint enforcement used in external site authentication further includes intercepting a request to establish an encrypted session from the client to the external site; sending a request to establish the encrypted session on behalf of the client to the external site; sending an encrypted session response to the client on behalf of the external site using a session key associated with the firewall device; decrypting encrypted traffic between the client and the external site to monitor for a request from the client to create a tunnel using the first protocol with the external site; allowing the request to create the tunnel; and monitoring decrypted session traffic between the client and the external site over the tunnel based on one or more firewall policies that include a policy for password constraint enforcement used in the external site authentication.

In some embodiments, password constraint enforcement used in external site authentication further includes intercepting a request to establish an encrypted session from the client to the external site; sending a request to establish the encrypted session on behalf of the client to the external site; sending an encrypted session response to the client on behalf of the external site using a session key associated with the firewall device; decrypting encrypted traffic between the client and the external site to monitor for a request from the client to create a tunnel using the first protocol with the external site; allowing the request to create the tunnel; monitoring decrypted session traffic between the client and the external site over the tunnel based on one or more firewall policies; and blocking the session traffic if a violation of a first firewall policy is determined, in which the first firewall policy includes a policy for password constraint enforcement used in the external site authentication.

In some embodiments, password constraint enforcement used in external site authentication further includes intercepting a request to establish an encrypted session from the client to the external site; sending a request to establish the encrypted session on behalf of the client to the external site; sending an encrypted session response to the client on behalf of the external site using a session key associated with the firewall device; decrypting encrypted traffic between the client and the external site to monitor for a request from the client to create a tunnel using the first protocol with the external site; allowing the request to create the tunnel; monitoring decrypted session traffic between the client and the external site over the tunnel based on one or more firewall policies; and generating an alert if a violation of a first firewall policy is determined, in which the first firewall policy includes a policy for password constraint enforcement used in the external site authentication.

In some embodiments, password constraint enforcement used in external site authentication further includes intercepting a request to establish an encrypted session from the client to the external site; sending a request to establish the encrypted session on behalf of the client to the external site; sending an encrypted session response to the client on behalf of the external site using a session key associated with the firewall device; decrypting encrypted traffic between the client and the external site to monitor for a request from the client to create a tunnel using the first protocol with the external site; allowing the request to create the tunnel; monitoring decrypted session traffic between the client and the external site over the tunnel based on one or more firewall policies; and blocking the client from accessing the external site if a violation of a first firewall policy is determined, in which the first firewall policy includes a policy for password constraint enforcement used in the external site authentication.

In some embodiments, password constraint enforcement used in external site authentication further includes intercepting a request to establish an encrypted session from the client to the external site; sending a request to establish the encrypted session on behalf of the client to the external site; sending an encrypted session response to the client on behalf of the external site using a session key associated with the firewall device; decrypting encrypted traffic between the client and the external site to monitor for a request from the client to create a tunnel using the first protocol with the external site; allowing the request to create the tunnel; monitoring decrypted session traffic between the client and the external site over the tunnel based on one or more firewall policies; and sending a message to the client if a violation of a first firewall policy is determined, in which the first firewall policy includes a policy for password constraint enforcement used in the external site authentication.

In some embodiments, password constraint enforcement used in external site authentication further includes performing a password complexity check against the username and password credentials being submitted to the external site.

In some embodiments, password constraint enforcement used in external site authentication further includes determining the application (e.g., using a firewall that can provide App ID, such as described herein) of the external site; using a decoder for the application to identify a username and password credentials being submitted to the external site; and performing a password complexity check against the username and password credentials. For example, an App-ID engine of the firewall can also check change your password page(s) of the external site to enforce credentials constraint when a user is attempting to change their password (e.g., to perform various responsive actions, such as to intercept, log, alert, block, and/or various other actions based on a policy).

In some embodiments, password constraint enforcement used in external site authentication further includes performing uniform resource locator (URL) filtering (e.g., using a firewall that can provide content filtering, such as described herein) to identify the external site; using a decoder to identify a username and password credentials for the form used for the identified external site (e.g., to identify the external web site, such as an external sales CRM site or another external site, so that the firewall can automatically identify a name of a form variable that stores a login id and a name of a form variable that stores a password); and performing a password complexity check against the username and password credentials.

In some embodiments, password constraint enforcement used in external site authentication further includes determining the user (e.g., using a firewall that can provide User ID, such as described herein) communicating with the external site; and storing the username and password credentials submitted by the user to the external site in a user credentials cache.

In some embodiments, password constraint enforcement used in external site authentication further includes performing pattern matching to identify the username and password credentials being submitted to the external site; and performing a password complexity check against the username and password credentials.

In some embodiments, password constraint enforcement used in external site authentication further includes performing a password complexity check against the username and password credentials being submitted to the external site; and logging a vulnerability when a user submits a non-compliant password to the external site based on a policy.

In some embodiments, password constraint enforcement used in external site authentication further includes performing a password complexity check against the username and password credentials being submitted to the external site; and injecting a block/continue page into the stream (e.g., that would be presented to the user) based on a policy.

In some embodiments, password constraint enforcement used in external site authentication further includes maintaining a user credentials cache.

In some embodiments, password constraint enforcement used in external site authentication further includes maintaining a user credentials cache; and triggering a vulnerability if an identical (e.g., or very similar) login/password credentials is used at more than one external site for a user (e.g., user credentials used by that user being duplicated across multiple external sites, in which a policy can perform various responsive actions, such as to log, alert, block, and/or perform various other actions).

In some embodiments, password constraint enforcement used in external site authentication further includes maintaining a user credentials cache; and triggering a vulnerability if a login/password credentials is used at the external site for a user that matches (e.g., or is too similar) to login/password credentials used by that user for an enterprise account (e.g., internal user credentials used by that same user being reused for the external site, in which a policy can perform various responsive actions, such as to log, alert, block, and/or perform various other actions).

Accordingly, various techniques for providing password constraint enforcement used in external site authentication are disclosed (e.g., by facilitating deep packet inspection of the encrypted session traffic). As will be apparent to one skilled in the art in view of the various techniques and embodiments described herein, the various techniques described herein for providing password constraint enforcement used in external site authentication can similarly be applied to various types of secure/encrypted protocols that support tunneling.

FIG. 1 is a functional diagram of an architecture of a security device that can be used for providing password constraint enforcement used in external site authentication in accordance with some embodiments. As shown in FIG. 1, network traffic is monitored at a firewall 100. In some embodiments, network traffic is monitored using a data appliance (e.g., a data appliance that includes security functions, such as a security device/appliance that includes a firewall). In some embodiments, network traffic is monitored using a gateway (e.g., a gateway that includes security functions, such as a security gateway). In some embodiments, the network traffic is monitored using pass through (e.g., in line) monitoring techniques.

In some embodiments, network traffic is monitored using a state-based firewall. In some embodiments, the state-based firewall can monitor traffic flows using an APP-ID engine (e.g., App Signature Check & User ID Check 108). For example, the monitored network traffic can include HTTP traffic, HTTPS traffic, FTP traffic, SSL traffic, SSH traffic, DNS requests, unclassified application traffic (e g, unknown application traffic), and/or other types of traffic (e.g., traffic using other types of known or unknown protocols).

As shown in FIG. 1, network traffic monitoring begins at 102. An IP address and port engine 104 determines an IP address and port number for a monitored traffic flow (e.g., a session) based on packet analysis. In some embodiments, user identification is then determined (e.g., user ID can be deduced based on the source IP address). A policy check engine 106 determines whether any policies can be applied based on the IP address and port number. As also shown in FIG. 1, an application signature check engine 108 identifies an application (e.g., using an APP-ID engine using various application signatures for identifying applications based on packet flow analysis). For example, APP-ID engine 108 can be configured to determine what type of traffic the session involves, such as HTTP traffic, HTTPS traffic, FTP traffic, SSL traffic, SSH traffic, DNS requests, unknown traffic, and various other types of traffic, and such classified traffic can be directed to an appropriate decoder, such as decoders 112, 114, and 116, to decode the classified traffic for each monitored session's traffic flow. If the monitored traffic is encrypted (e.g., encrypted using HTTPS, SSL, SSH, or another known encryption protocol), then the monitored traffic can be decrypted using a decrypt engine 110 (e.g., applying trusted man-in-the-middle techniques using a self-signed certificate). A known protocol decoder engine 112 decodes and analyzes traffic flows using known protocols (e.g., applying various signatures for the known protocol) and reports the monitored traffic analysis to a report and enforce policy engine 120. Identified traffic (no decoding required) engine 114 reports the identified traffic to the report and enforce policy engine 120. An unknown protocol decoder engine 116 decodes and analyzes traffic flows (e.g., applying various heuristics) and reports the monitored traffic analysis to the report and enforce policy engine 120.

In some embodiments, the results of the various traffic monitoring techniques using known protocol decoder engine 112, identified traffic engine 114, and unknown protocol decoder engine 116 described above are provided to report and enforce policies engine 120 (e.g., network/routing policies, security policies, and/or firewall policies). For example, firewall policies can be applied to the monitored network traffic using application identification, user identification, and/or other information to match signatures (e.g., file-based, protocol-based, and/or other types/forms of signatures for detecting malware or suspicious behavior).

In some embodiments, firewall 100 also includes a content-ID engine (not shown), and, in some embodiments, the content-ID engine's identified content is also used by report and enforce policy engine 120, possibly in various combinations with other information, such as application, user, and/or other information, to enforce various security/firewall policies/rules.

In some embodiments, firewall 100 also includes a password constraint enforcement engine 118 for providing password constraint enforcement used in external site authentication, such as described below with respect to FIGS. 7 and 8 and with respect to various other embodiments disclosed herein.

In some embodiments, various other functional architectures and flows are provided to implement techniques for providing password constraint enforcement used in external site authentication as described herein. For example, some of these functions can be implemented in software executed on a general processor and/or some of these functions can be implemented using hardware acceleration techniques for faster packet processing of network traffic.

Figure 2:
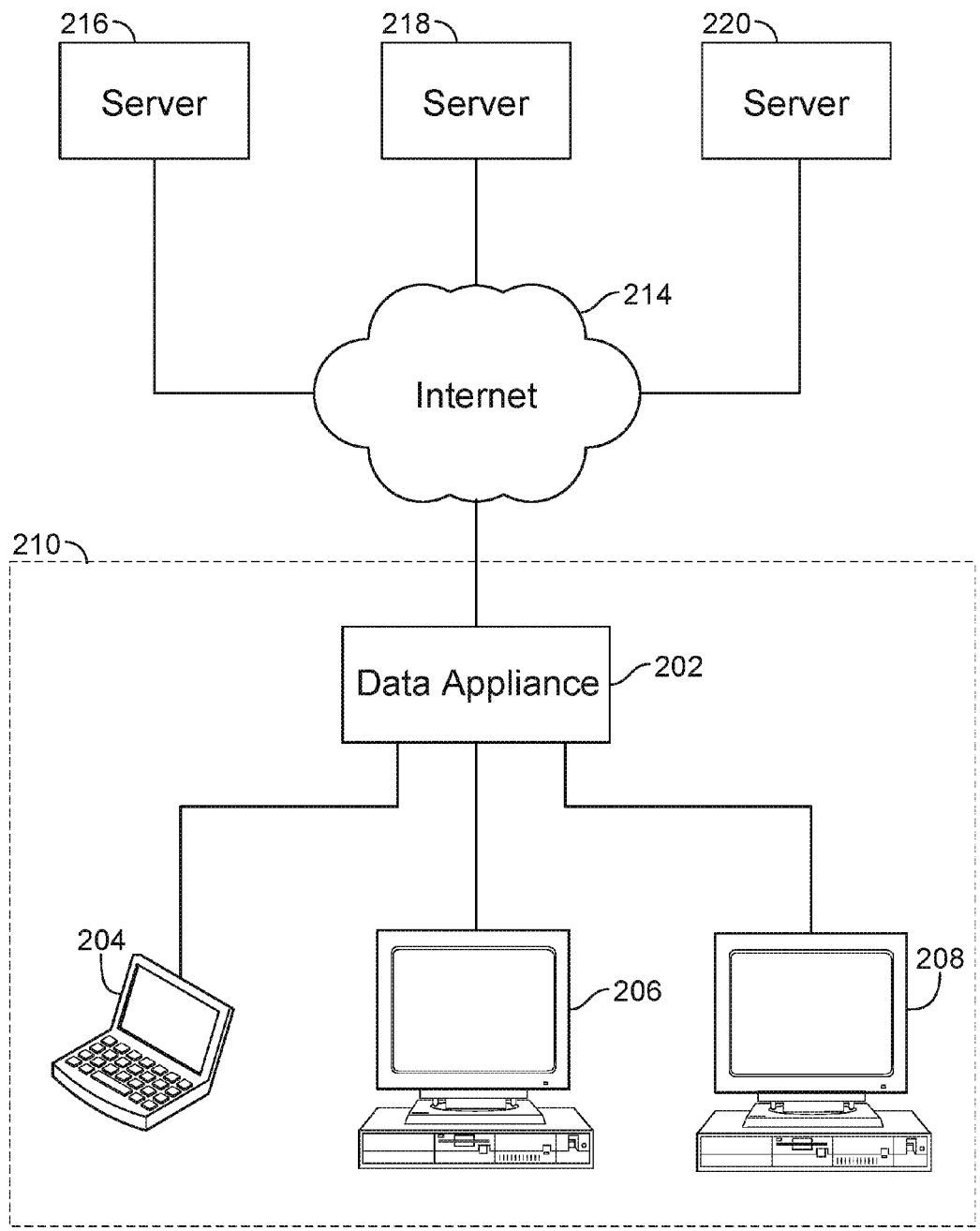
FIG. 2 is a block diagram of a network architecture that can be used for providing password constraint enforcement used in external site authentication in accordance with some embodiments.

FIG. 2 is a block diagram of a network architecture that can be used for providing password constraint enforcement used in external site authentication in accordance with some embodiments. As shown, a data appliance 202 (e.g., a data appliance that includes security functions, such as a security appliance/device that includes a firewall, a gateway that includes security functions, such as a security gateway, and/or any other device that includes a firewall function as described herein) is at the perimeter of a protected network 210, which includes clients 204, 206, and 208. Data appliance 202 includes a firewall function, such as firewall function 100 as described above, to protect the network and clients within the protected network 210, which is in communication with the Internet 214 and various servers, such as servers 216, 218, and 220 (e.g., web servers, mail servers, file servers, and/or other types of servers).

Figure 3A:
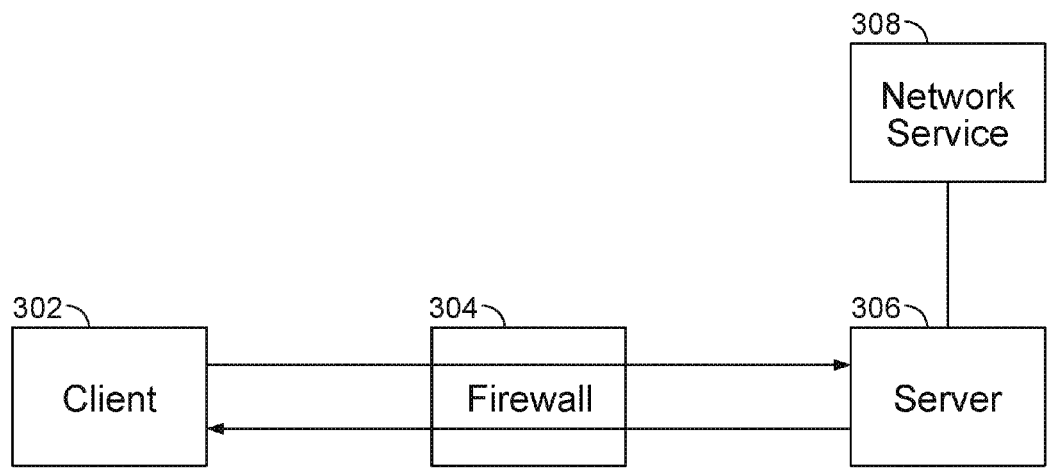
FIG. 3A is a functional block diagram illustrating a typical SSL session passing through a firewall.

FIG. 3A is a functional block diagram illustrating a typical SSL session passing through a firewall. In that session, the firewall can only inspect the handshake traffic, as all the application data is encrypted. As shown, a client 302 establishes a secure tunnel session (e.g., creates an SSL tunnel) with a remote server 306. The client 302 can use the secure tunnel with the server 306 to access a network service 308, which can be a network service activity that is in violation of one or more firewall policies/rules implemented by the firewall device 304 (e.g., a policy that includes password complexity requirements for external site authentication). However, because the secure tunnel session traffic is encrypted and passes through a firewall 304, the firewall 304 cannot decrypt the encrypted secure tunnel session traffic and, thus, cannot detect such firewall policy/rule violation(s).

Accordingly, various techniques for intercepting and decoding encrypted tunneling communications from a client to a remote server are disclosed herein. For example, a trusted man-in-the-middle technique that can be used for intercepting and decoding encrypted tunneling communications to monitor such traffic in the clear is described below with respect to FIG. 3B.

Figure 3B:
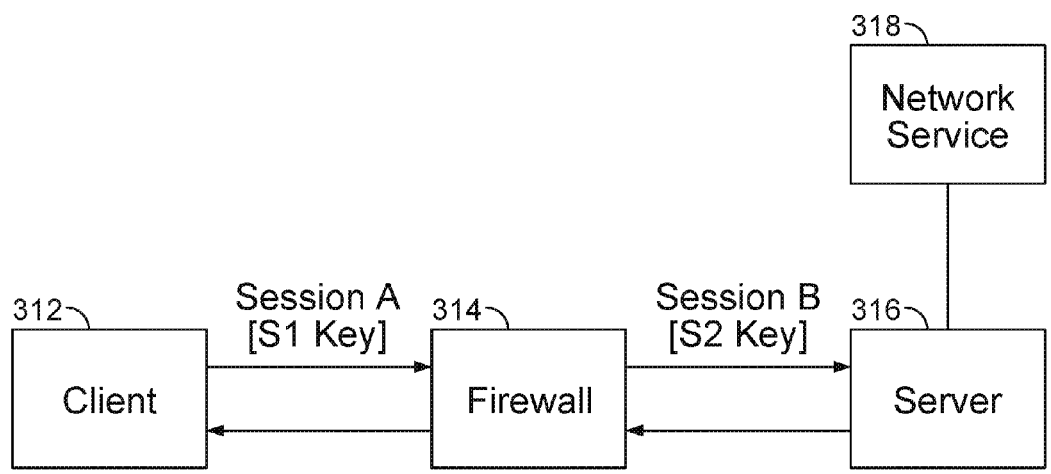
FIG. 3B is a functional block diagram illustrating the use of a firewall for providing password constraint enforcement used in external site authentication in accordance with some embodiments.

FIG. 3B is a functional block diagram illustrating the use of a firewall for providing password constraint enforcement used in external site authentication in accordance with some embodiments. As shown, a client 312 attempts to establish an SSL session with a remote server 316. The client 312 can attempt to use, for example, a secure tunnel with the server 316 to access a network service 318, which can be a network service activity that is in violation of one or more firewall policies/rules implemented by a firewall device 314. However, in this case, the SSL session request is intercepted and detected by the firewall 314. In response, the firewall 314 performs a trusted man-in-the-middle technique by effectively splitting the SSL session between the client 312 and the remote server 316 into two half sessions shown as Session A and Session B in FIG. 3B. In Session A, the firewall 314 acts as the remote server 316 such that it is transparent to the client 312 that it is not communicating directly with the remote server 316. Session A traffic is encrypted using the session key S1 associated with the firewall device. In Session B, the firewall 314 acts as the client 312 such that it is transparent to the remote server 316 that it is not communicating directly with the client 312. Session B traffic is encrypted using the session key S2 associated with the firewall device (e.g., the firewall device can store the fingerprint from the remote server in association with that remote server IP address). After the session set-up handshaking is completed for each of Session A and Session B, any data that is communicated from the client 312 to the firewall 314 is decrypted using a session key S1 and is then inspected by the firewall 314. If the client 312 requests a new channel to perform tunneling (e.g., a create SSL tunnel request), the firewall 314 can detect the request by the client 312 to establish an encrypted tunnel with the remote server 316. In response, the firewall 314 can perform various responsive actions. For example, the firewall 314 can deny (e.g., tear down) the entire session, the firewall 314 can send a not-supported response back to the client and avoid creation of the new tunnel (e.g., informing the client that the remote server does not support tunneling), the firewall 314 can mark the sessions as SSL-tunneling-traffic and continue to monitor the session traffic for firewall policy/rule compliance (e.g., for the life of the session, for a predetermined period of time, and/or until a predetermined event occurs), and/or the firewall 314 can perform other responsive actions or combinations of various responsive actions. In some cases, if the traffic is determined to be authorized SSL remote-access traffic, the firewall 314 encrypts the tunneled traffic using a session key S2 and forwards the encrypted traffic to the remote server 316. Similarly, traffic coming from the server is decrypted with the session key S2, inspected by the firewall 314, and then encrypted using the session key S1 and forwarded to the client 312.

Thus, using these techniques, the firewall 314 is between the client 312 and the server 316 and can present itself as server of the session to the client and can present itself as the client of the session to the server. In this manner, the firewall 314 can inspect decrypted traffic and re-encrypt it before forwarding it to the other party. During inspection, if encrypted tunneling traffic is detected, the entire session can either be torn down or various other responsive actions can be performed as described herein. As will be apparent to one skilled in the art in view of the various techniques and embodiments described herein, while the embodiments described above are described with reference to the SSL protocol, the various techniques described herein for providing password constraint enforcement used in external site authentication can similarly be applied to other encrypted protocols that support tunneling.

Figure 4:
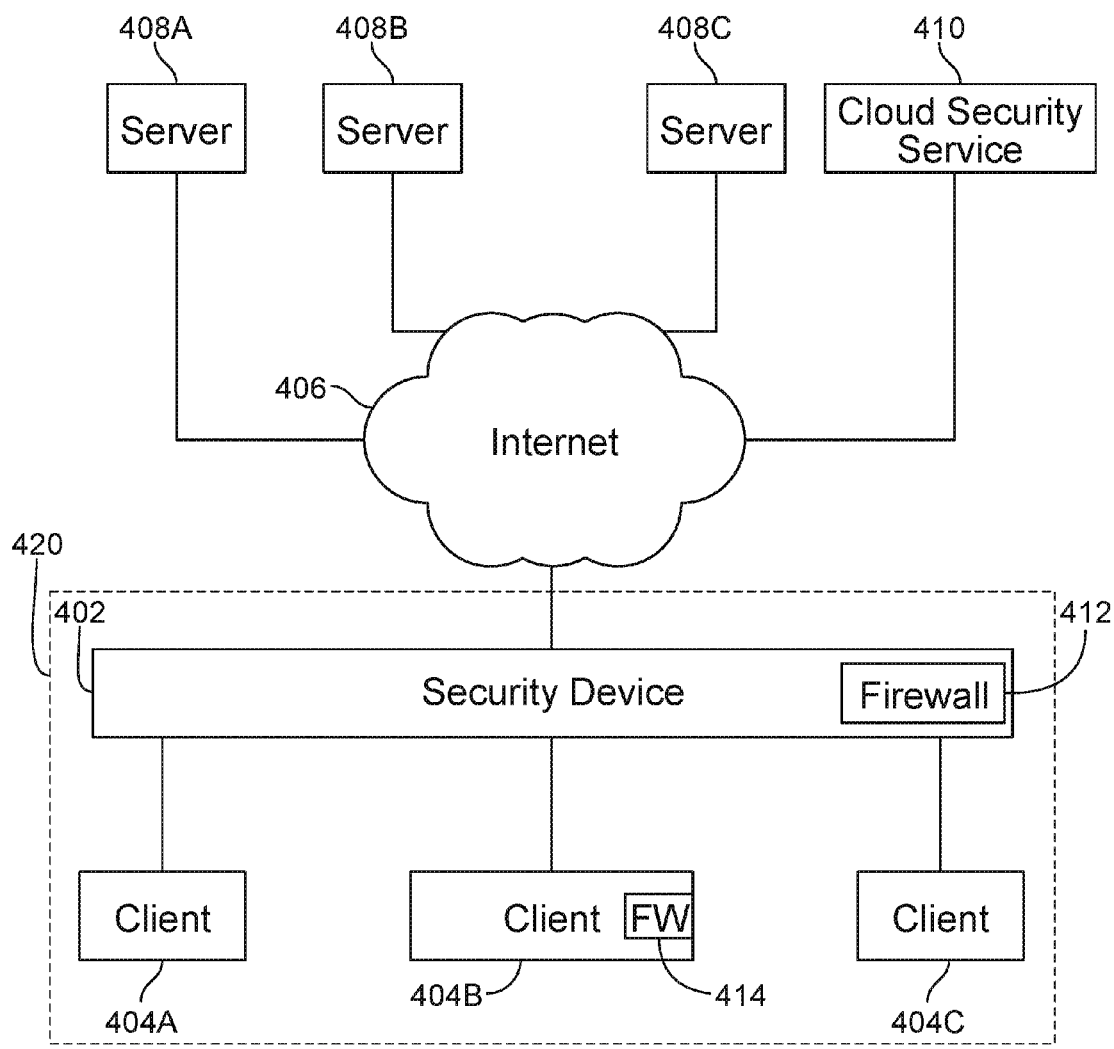
FIG. 4 is a block diagram illustrating another network architecture for providing password constraint enforcement used in external site authentication in accordance with some embodiments.

FIG. 4 is a block diagram illustrating another network architecture for providing password constraint enforcement used in external site authentication in accordance with some embodiments. As shown in FIG. 4, client devices 404A, 404B, and 404C are in communication with the Internet 406 via a security device 402. In some embodiments, the security device 402 includes a firewall 412 as shown, which can be used for security for enterprise network 420. In some embodiments, one or more of the client devices 404A-404C include a firewall 414 (e.g., host-based firewall) as shown. In some embodiments, the security device 402 includes a data appliance (e.g., a security appliance), a gateway (e.g., a security server), a server (e.g., a server that executes security software including firewall 412), and/or some other security device, which, for example, can be implemented using computing hardware, software, or various combinations thereof. In some embodiments, firewall 412 and/or firewall 414 perform some or all of the functions described above with respect to FIGS. 1 and 3B. For example, client devices 404A-C can include various computing devices that can access the Internet via wired and/or wireless communications, such as computer, laptops, tablets, smart phones, and/or various other types of computing devices with network communication capabilities. As also shown, servers 408A-C are in communication with the Internet 406. For example, a client device can access a service provided by a server via the Internet, such as a web-related service (e.g., web site, cloud-based services, streaming services, or email service), peer-to-peer related service (e.g., file sharing), IRC service (e.g., chat service), and/or any other service that can be delivered via the Internet.

As will now be apparent, some or all of the functions described above with respect to FIGS. 1 and 3B can be assisted by or implemented in whole or in part by the security cloud service 410. The security cloud service 410 can, for example, reduce the processing on the security device 402. As another example, detection of security policy violations and/or vulnerabilities based on password constraint enforcement used in external site authentication can be reported to the security cloud service 410 by the security device 402.

Figure 5:
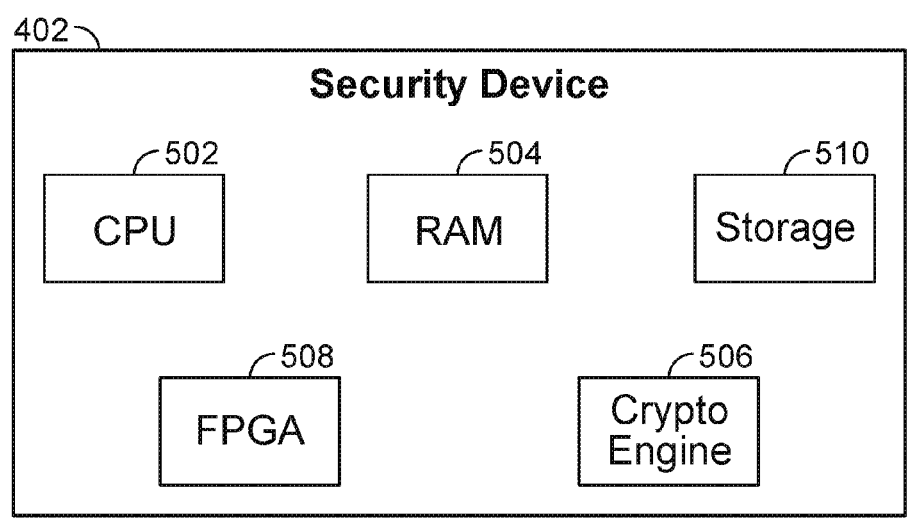
FIG. 5 is a functional diagram of hardware components of a security device for providing password constraint enforcement used in external site authentication in accordance with some embodiments.

FIG. 5 is a functional diagram of hardware components of a security device for providing password constraint enforcement used in external site authentication in accordance with some embodiments. The example shown is a representation of physical components that can be included in security device 402 (e.g., an appliance, gateway, or server). Specifically, security device 402 includes a high performance multi-core CPU 502 and RAM 504. Security device 402 also includes a storage 510 (e.g., one or more hard disks or solid state storage units), which is used to store policy and other configuration information as well as signatures. In some embodiments, storage 510 stores tables that include host names/identifiers and associated IP addresses and possibly other information for clients and/or remote servers identified as external sites that are monitored for providing password constraint enforcement used in external site authentication. In some embodiments, storage 510 stores a user credentials cache that includes usernames and passwords (e.g., a hash of the password data can be stored, such as using an MD5 hash or another hash algorithm) associated with each external site for each user that can be used for providing password constraint enforcement used in external site authentication. Security device 402 can also include one or more optional hardware accelerators. For example, security device 402 can include a cryptographic engine 506 configured to perform encryption and decryption operations, and one or more FPGAs 508 configured to perform signature matching, act as network processors, and/or perform other tasks.

Figure 6:
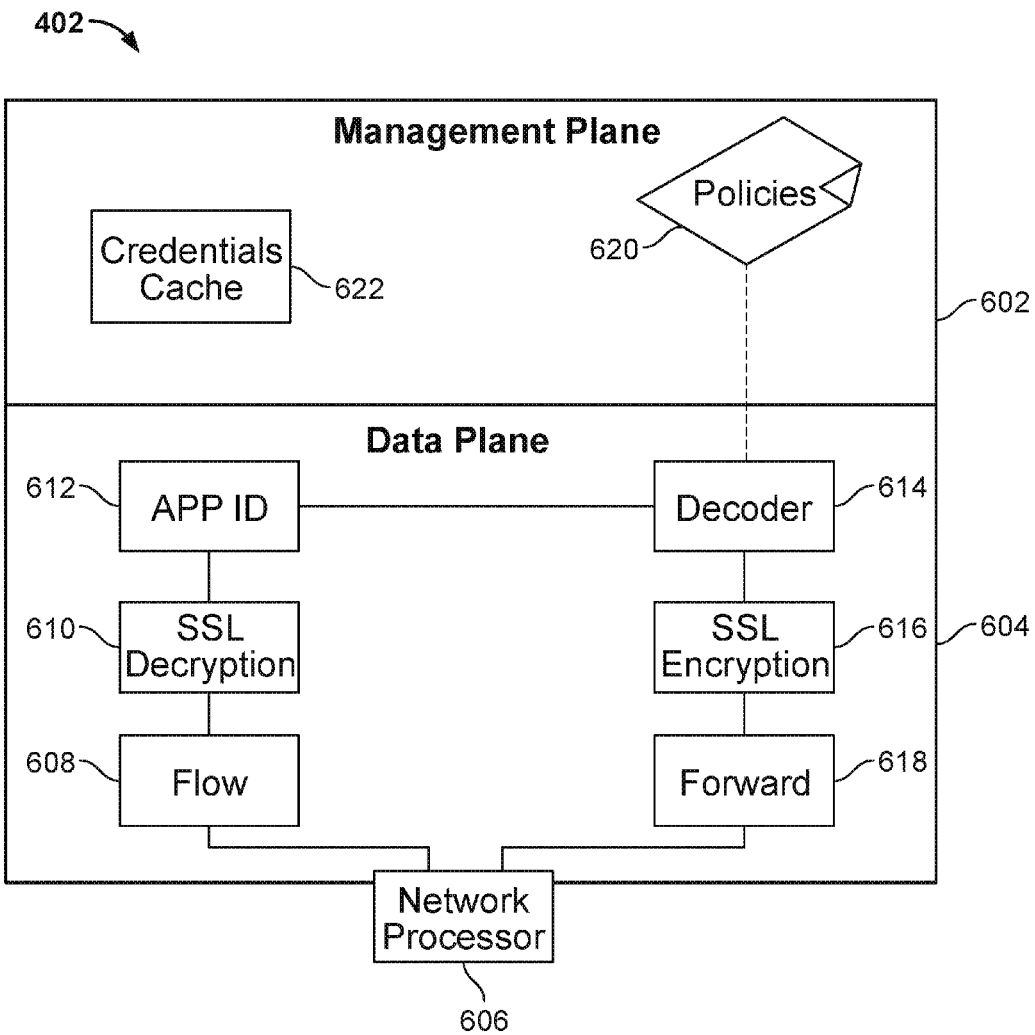
FIG. 6 is a functional diagram of logical components of a security device for providing password constraint enforcement used in external site authentication in accordance with some embodiments.

FIG. 6 is a functional diagram of logical components of a security device for providing password constraint enforcement used in external site authentication in accordance with some embodiments. The example shown is a representation of logical components that can be included in security device 402. As shown, security device 402 includes a management plane 602 and a data plane 604. In some embodiments, the management plane is responsible for managing user interactions, such as by providing a user interface for configuring policies and viewing log data. The data plane is responsible for managing data, such as by performing packet processing and session handling.

Suppose a client 404A attempts to access a server 408B using an encrypted session protocol, such as SSL. Network processor 606 is configured to receive packets from client 404A, and provide the packets to data plane 604 for processing. Flow 608 identifies the packets as being part of a new session and creates a new session flow. Subsequent packets will be identified as belonging to the session based on a flow lookup. If applicable, SSL decryption is applied by SSL decryption engine 610 using various techniques as described herein. Otherwise, processing by SSL decryption engine 610 is omitted. Application identification module 612 is configured to determine what type of traffic the session involves and to identify a user associated with the traffic flow. For example, application identification module 612 can recognize a GET request in the received data and conclude that the session requires an HTTP decoder. For each type of protocol, there exists a corresponding decoder 614. In some embodiments, the application identification is performed by an application identification module (e.g., APP-ID engine), and a user identification is performed by another function/engine. Based on the determination made by application identification module 612, the packets are sent to an appropriate decoder 614. Decoder 614 is configured to assemble packets (e.g., which may be received out of order) into the correct order, perform tokenization, and extract out information (e.g., to identify username/password credentials being submitted to an external site for user authentication). Decoder 614 also performs signature matching to determine what should happen to the packet. SSL encryption engine 616 performs SSL encryption using various techniques as described herein. As also shown, policies 620 are received and stored in the management plane 602. In some embodiments, policy enforcement (e.g., policies can include one or more rules, which can be specified using domain and/or host/server names, and rules can apply one or more signatures or other matching criteria or heuristics, such as for providing password constraint enforcement used in external site authentication) using signatures is applied as described herein with respect to various embodiments based on the monitored, decrypted, identified, and decoded session traffic flows. In some embodiments, a credentials cache 622 is also provided for maintaining user credentials (e.g., a cache that can include usernames and passwords, such as a hash of the password data, can be stored, such as using an MD5 hash or another hash algorithm) associated with each external site for each user that can be used for providing password constraint enforcement used in external site authentication.

Figure 7:
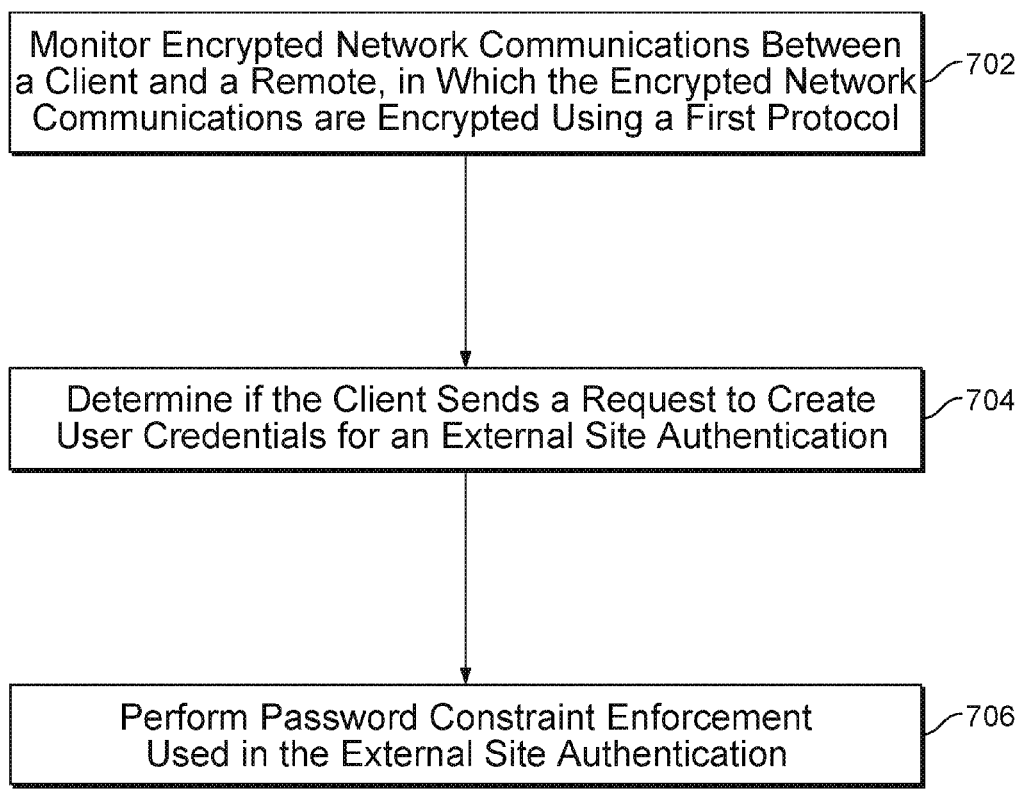
FIG. 7 is a flow diagram for providing password constraint enforcement used in external site authentication in accordance with some embodiments.

FIG. 7 is a flow diagram for providing password constraint enforcement used in external site authentication in accordance with some embodiments. At 702, monitoring encrypted network communications between a client and a remote server is performed, in which the encrypted network communications are encrypted using a first protocol. At 704, determining if the client sends a request to create user credentials for an external site authentication is performed. At 706, password constraint enforcement used in the external site authentication is performed.

Figure 8:
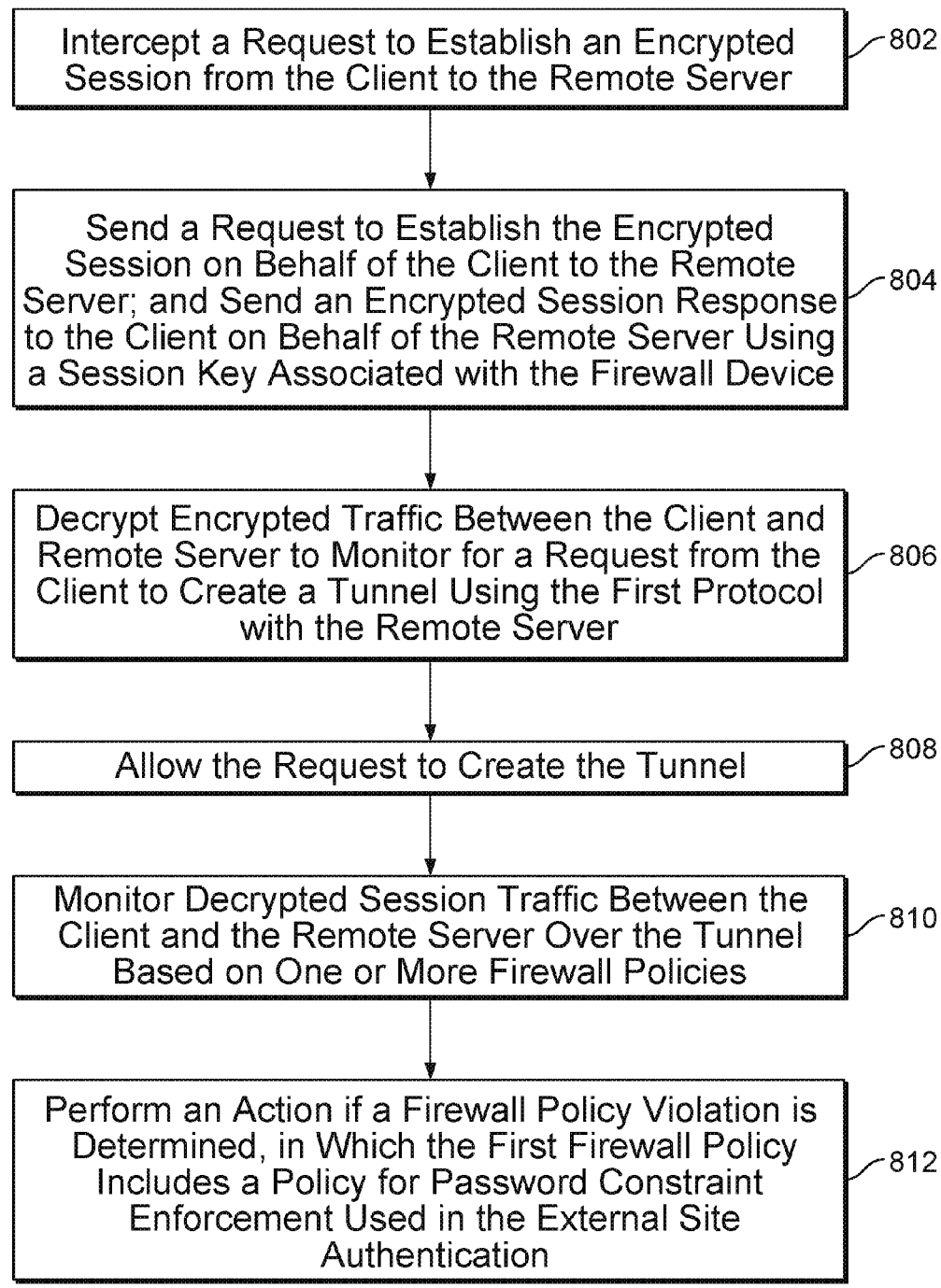
FIG. 8 is another flow diagram for providing password constraint enforcement used in external site authentication in accordance with some embodiments.

FIG. 8 is another flow diagram for providing password constraint enforcement used in external site authentication in accordance with some embodiments. At 802, intercepting a request to establish an encrypted session from the client to the remote server is performed. At 804, sending a request to establish the encrypted session on behalf of the client to the remote server is performed, and sending an encrypted session response to the client on behalf of the remote server using a session key associated with the firewall device is performed. At 806, decrypting encrypted traffic between the client and remote server to monitor for a request from the client to create a tunnel using the first protocol with the remote server is performed. At 808, allowing the request to create the tunnel is performed. At 810, monitoring decrypted session traffic between the client and the remote server over the tunnel based on one or more firewall policies is performed. At 812, an action is performed if a firewall policy violation is determined, in which the first firewall policy includes a policy for password constraint enforcement used in the external site authentication.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for password constraint enforcement used in external site authentication, comprising:
a processor configured to:
monitor encrypted network communications between a client of a plurality of clients and an external site, wherein the encrypted network communications are encrypted using a first protocol, comprising:
decrypt the monitored encrypted network communications between the client and the external site to implement password constraint enforcement used in the external site authentication; and
determine if the client sends a request to create user credentials for an external site authentication, comprising:
determine whether the encrypted network communications includes the request received via a network from the client to be forwarded to the external site; and
in the event that the encrypted network communications includes the request received via the network from the client, determine whether the request relates to creating a new user account on the external site, the request including a new password associated with the new user account;
in the event that the client sends the request to create user credentials for the external site authentication:
perform password constraint enforcement used in the external site authentication, wherein the password constraint enforcement includes password complexity constraints for internal users, password complexity constraints for internal users creating authentication credentials on external sites, a policy not to use the same password on a plurality of external sites, a policy not to use a user's enterprise password on an external site, or any combination thereof; and
a memory coupled to the processor and configured to provide the processor with instructions.

2. The system recited in claim 1, wherein the password constraint enforcement is based on a username constraint, a password constraint, or both a username constraint and a password constraint.

3. The system recited in claim 1, wherein the processor is further configured to:
perform an action in response to determining that the client sent the request to create user credentials for the external site authentication.

4. The system recited in claim 1, wherein the processor is further configured to:
intercept a request to establish an encrypted session from the client to the external site; and
send a request to establish the encrypted session on behalf of the client to the external site.

5. The system recited in claim 1, wherein the system is a firewall device, and wherein the processor is further configured to:
intercept a request to establish an encrypted session from the client to the external site;
send a request to establish the encrypted session on behalf of the client to the external site; and
send an encrypted session response to the client on behalf of the external site using a session key associated with the firewall device.

6. The system recited in claim 1, wherein the system includes a firewall device, and wherein the processor is further configured to:
intercept a request to establish an encrypted session from the client to the external site;
send a request to establish the encrypted session on behalf of the client to the external site;
send an encrypted session response to the client on behalf of the external site using a session key associated with the firewall device; and
decrypt encrypted session traffic between the client and the external site to monitor for a request from the client to create a tunnel using the first protocol with the external site.

7. The system recited in claim 1, wherein the system includes a firewall device, and wherein the processor is further configured to:
intercept a request to establish an encrypted session from the client to the external site;
send a request to establish the encrypted session on behalf of the client to the external site;
send an encrypted session response to the client on behalf of the external site using a session key associated with the firewall device;
decrypt encrypted traffic between the client and the external site to monitor for a request from the client to create a tunnel using the first protocol with the external site;
allow the request to create the tunnel; and
monitor decrypted session traffic between the client and the external site over the tunnel based on one or more firewall policies that includes a policy for password constraint enforcement used in the external site authentication.

8. The system recited in claim 1, wherein the system includes a firewall device, and wherein the processor is further configured to:
intercept a request to establish an encrypted session from the client to the external site;
send a request to establish the encrypted session on behalf of the client to the external site;
send an encrypted session response to the client on behalf of the external site using a session key associated with the firewall device;
decrypt encrypted traffic between the client and the external site to monitor for a request from the client to create a tunnel using the first protocol with the external site;
allow the request to create the tunnel;
monitor decrypted session traffic between the client and the external site over the tunnel based on one or more firewall policies; and
block the session traffic if a violation of a first firewall policy is determined, wherein the first firewall policy includes a policy for password constraint enforcement used in the external site authentication.

9. The system recited in claim 1, wherein the system includes a firewall device, and wherein the processor is further configured to:
intercept a request to establish an encrypted session from the client to the external site;
send a request to establish the encrypted session on behalf of the client to the external site;
send an encrypted session response to the client on behalf of the external site using a session key associated with the firewall device;
decrypt encrypted traffic between the client and the external site to monitor for a request from the client to create a tunnel using the first protocol with the external site;

allow the request to create the tunnel;
monitor decrypted session traffic between the client and the external site over the tunnel based on one or more firewall policies; and
generate an alert if a violation of a first firewall policy is determined, wherein the first firewall policy includes a policy for password constraint enforcement used in the external site authentication.

10. The system recited in claim 1, wherein the system includes a firewall device, and wherein the processor is further configured to:
intercept a request to establish an encrypted session from the client to the external site;
send a request to establish the encrypted session on behalf of the client to the external site;
send an encrypted session response to the client on behalf of the external site using a session key associated with the firewall device;
decrypt encrypted traffic between the client and the external site to monitor for a request from the client to create a tunnel using the first protocol with the external site;
allow the request to create the tunnel;
monitor decrypted session traffic between the client and the external site over the tunnel based on one or more firewall policies; and
block the client from accessing the external site if a violation of a first firewall policy is determined, wherein the first firewall policy includes a policy for password constraint enforcement used in the external site authentication.

11. The system recited in claim 1, wherein the system includes a firewall device, and wherein the processor is further configured to:
intercept a request to establish an encrypted session from the client to the external site;
send a request to establish the encrypted session on behalf of the client to the external site;
send an encrypted session response to the client on behalf of the external site using a session key associated with the firewall device;
decrypt encrypted traffic between the client and the external site to monitor for a request from the client to create a tunnel using the first protocol with the external site;
allow the request to create the tunnel;
monitor decrypted session traffic between the client and the external site over the tunnel based on one or more firewall policies; and
send a message to the client if a violation of a first firewall policy is determined, wherein the first firewall policy includes a policy for password constraint enforcement used in the external site authentication.

12. The system recited in claim 1, wherein the system includes a firewall appliance, and the first protocol is a Secure Sockets Layer (SSL) protocol or an HTTPS protocol.

13. A method for password constraint enforcement used in external site authentication, comprising:
monitoring encrypted network communications between a client of a plurality of clients and an external site, wherein the encrypted network communications are encrypted using a first protocol, comprising:
decrypting the monitored encrypted network communications between the client and the external site to implement password constraint enforcement used in the external site authentication;
determining if the client sends a request to create user credentials for an external site authentication, comprising:
determining whether the encrypted network communications includes the request received via a network from the client to be forwarded to the external site; and
in the event that the encrypted network communications includes the request received via the network from the client, determining whether the request relates to creating a new user account on the external site, the request including a new password associated with the new user account;
in the event that the client sends the request to create user credentials for the external site authentication:
performing password constraint enforcement used in the external site authentication, wherein the password constraint enforcement includes password complexity constraints for internal users, password complexity constraints for internal users creating authentication credentials on external sites, a policy not to use the same password on a plurality of external sites, a policy not to use a user's enterprise password on an external site, or any combination thereof.

14. The method of claim 13, further comprising:
performing an action in response to determining that the client sent the request to create user credentials for the external site authentication.

15. A computer program product for password constraint enforcement used in external site authentication, the computer program product being embodied in a tangible computer readable storage medium and comprising computer instructions for:
monitoring encrypted network communications between a client of a plurality of clients and an external site, wherein the encrypted network communications are encrypted using a first protocol, comprising:
decrypting the monitored encrypted network communications between the client and the external site to implement password constraint enforcement used in the external site authentication;
determining if the client sends a request to create user credentials for an external site authentication, comprising:
determining whether the encrypted network communications includes the request received via a network from the client to be forwarded to the external site; and
in the event that the encrypted network communications includes the request received via the network from the client, determining whether the request relates to creating a new user account on the external site, the request including a new password associated with the new user account;
in the event that the client sends the request to create user credentials for the external site authentication:
performing password constraint enforcement used in the external site authentication, wherein the password constraint enforcement includes password complexity constraints for internal users, password complexity constraints for internal users creating authentication credentials on external sites, a policy not to use the same password on a plurality of external sites, a policy not to use a user's enterprise password on an external site, or any combination thereof.

16. The computer program product recited in claim 15, further comprising computer instructions for:
performing an action in response to determining that the client sent the request to create user credentials for the external site authentication.

17. The system recited in claim 1, wherein the password complexity constraints for the internal users include a minimum password character length, the use of at least one uppercase alphanumeric character, the use of at least one number, the use of at least one symbol, or any combination thereof.

18. The system recited in claim 1, wherein the password complexity constraints for the internal users creating the new user account on the external site include a minimum password character length, the use of at least one uppercase alphanumeric character, the use of at least one number, the use of at least one symbol, or any combination thereof.

19. The system recited in claim 1, wherein the processor is further configured to:
- in the event that the password constraint enforcement determines the request to create user credentials for the external site authentication is non-compliant, perform a responsive action including block client access to the external site, log a vulnerability, discard the request to create user credentials, notify the client that the request is non-compliant, suggest at least one compliant password option, or any combination thereof.

* * * * *